United States Patent [19]
Balliet

[11] Patent Number: 6,009,554
[45] Date of Patent: Dec. 28, 1999

[54] SYSTEMS SAFETY VITAL ARBITER EMPLOYING NUMERICAL TECHNIQUES

[75] Inventor: James B. Balliet, Webster, N.Y.

[73] Assignee: General Railway Signal Corporation, Rochester, N.Y.

[21] Appl. No.: 08/932,572

[22] Filed: Sep. 19, 1997

[51] Int. Cl.⁶ .................................................. G06F 11/10
[52] U.S. Cl. ............................................................ 714/807
[58] Field of Search .................................... 714/807, 809

[56] References Cited

U.S. PATENT DOCUMENTS

| Re. 30,986 | 6/1982 | Sibley . | |
|---|---|---|---|
| 4,029,274 | 6/1977 | Sibley | 246/187 B |
| 4,181,849 | 1/1980 | Sibley . | |
| 4,494,717 | 1/1985 | Corrie et al. . | |
| 4,611,291 | 9/1986 | Hoelscher . | |
| 4,617,662 | 10/1986 | Auer, Jr. et al. | 371/25 |
| 4,740,972 | 4/1988 | Rutherford, Jr. . | |
| 4,831,521 | 5/1989 | Rutherford, Jr. . | |
| 5,048,064 | 9/1991 | Rutherford | 377/20 |
| 5,364,047 | 11/1994 | Petit et al. | 246/122 R |

Primary Examiner—Albert De Cady
Assistant Examiner—Samuel Lin
Attorney, Agent, or Firm—Ohlandt, Greeley, Ruggiero & Perle, L.L.P.

[57] ABSTRACT

A numerical vital relay driver serving as an independent arbiter of vital railway (control) system operation constituting a checkword translator for receiving system checkwords from a system processor in the form of "N" bit NISAL parameters and for implementing a hardware algorithm utilizing the checkwords. It also consists of variable waveform data tables, including means for translating the data in the tables into a periodic signal, wherein it is insured that only if the checkwords are present and correct within a specific check period and the operation of the hardware algorithm is correct, will the desired periodic signal be produced.

10 Claims, 2 Drawing Sheets

SYSTEMS SAFETY VITAL ARBITER EMPLOYING NUMERICAL TECHNIQUES

BACKGROUND OF THE INVENTION

The present invention relates to apparatus and techniques for performing vital processing in the context of a railway system that provides vital operation by which is meant that the system exhibits vital or fail safe characteristics, well-known to those skilled in the art.

More specifically, the invention constitutes an advancement over an original VRD (Vital Relay Driver) concept as embodied in the vital relay driver circuit assembly for a system known as VPI (Vital Processor Interlocking), VPI having been described in U.S. Pat. No. 4,831,521 and related patents such as: U.S. Pat. Nos. 4,498,650; 4,949,273; and 4,790,972.

The so-called VPI system and related systems are based, for the most part, on a logic scheme known as NISAL (Numerically Integrated Safety Assurance Logic), particular applications of which are described, for example, in U.S. Pat. No. 4,181,849, U.S. Pat. No. Reissue 30,986, U.S. Pat. Nos. 4,740,972 and 4,611,291.

The significant problem which has been presented in systems designs such as VPI and the like, is that the VRD (Vital Relay Driver) portion of the system gives rise to a deficiency because of its deviation from numerical safety assurance concepts that form the foundation of the remainder of the VPI system. The reason for this is that quantitative analysis has not been practical—because of the inordinate time consumption involved— with respect to safety assurance logic implementation of the VRD portion of the VPI design; i.e., painstaking safety analysis of software and hardware has been required. The results of the calculation of a "Probability Of Unsafe Event" for highly integrated electronic devices is impossible to substantiate with formal analysis. All possible failure modes and the associated effects cannot be demonstrated.

Accordingly, it is a primary object of the present invention to provide a VRD which overcomes the aforenoted problem. The new design for the VRD uses a discrete hardware circuit which implements a NISAL-based safety check algorithm only. Thus there is no software, microprocessors, etc., used in the present invention implementation of the VRD concept.

Another object is to provide a unique implementation of the contemplated VRD, henceforth, called NVRD (Numerical Vital Relay Driver). It will be understood that the philosophy of having any failure involving the corruption of one or more checkwords or failures within the hardware to lead directly to an infinitely random signal output from the checkword evaluator is not per se different in principle; however, the particular implementation as will be described is unique.

SUMMARY OF THE INVENTION

It will be understood by those skilled in the art that the NVRD of the present invention serves as an independent arbiter of vital system operation. This is accomplished principally by means of a checkword translator which functions to enable the translation of a variable waveform data table into a unique and predetermined DC or AC output signal. The characteristics of the output signal reveal the integrity of the data table contents. The translation circuitry permits a desired output signal only if the input data table meets pre-ordained contents and timing requirements and the operation of the hardware algorithm performs without error. Where the input data table matches, or corresponds with, system safety process check information from a vital processor (the standard case), the NVRD can be used to enable and sustain system vital operation as will be apparent.

The NVRD in one embodiment comprises two elements or components: a checkword translator and a vital filter (tuned decoder). The essential purpose of the numerical VRD is to obtain system checkwords (in "N" bit NISAL parameters) every system check period, and to translate the checkword table into a periodic signal. This signal is delivered to the vital filter which is of the variety historically used in many other vital applications. The output of the filter is a DC voltage capable of driving a standard "B" relay. The front contacts of this relay can be used to permit vital energy to be supplied to system outputs.

The invention is defined broadly as follows: a numerical vital relay driver serving as an independent arbiter of vital railway control system operation comprising; a checkword translator for receiving data signals, including system checkwords from a system vital processor in the form of N bit NISAL parameters specific check periods; means for translating the checkwords into periodic signals including an N bit linear feedback shift register (LFBSR) implementing a primitive polynomial division algorithm, said shift register being coupled at its input to the incoming checkwords and being coupled at its output to a means for integrating the output so as to provide a desired waveform; waveform data tables are provided, as well as means for combining the output therefrom with the output from said shift register, thereby to produce the required periodic signal output waveform; additionally, a vital filter means can be provided in the form of a tuned decoder coupled to the output of the checkword translator for supplying the periodic signal generated at the output to a vital relay whose operation permits vital energy to be supplied to system outputs.

It should be equally noted that the implementation of the vital relay driver of the present invention is based on numerical safety assurance techniques and therefore, a Probability of Unsafe Failure can be calculated (or derived). Consequently, the impractical qualitative and quantitative analysis of the former design is no longer required; nor is the painstaking safety analysis of software and hardware with the former design required.

Other and further objects, advantages and features of the present invention will be understood by reference to the following specification in conjunction with the annexed drawings, wherein like parts have been given like numbers.

DESCRIPTION OF PREFERRED EMBODIMENT

Figure 1A:
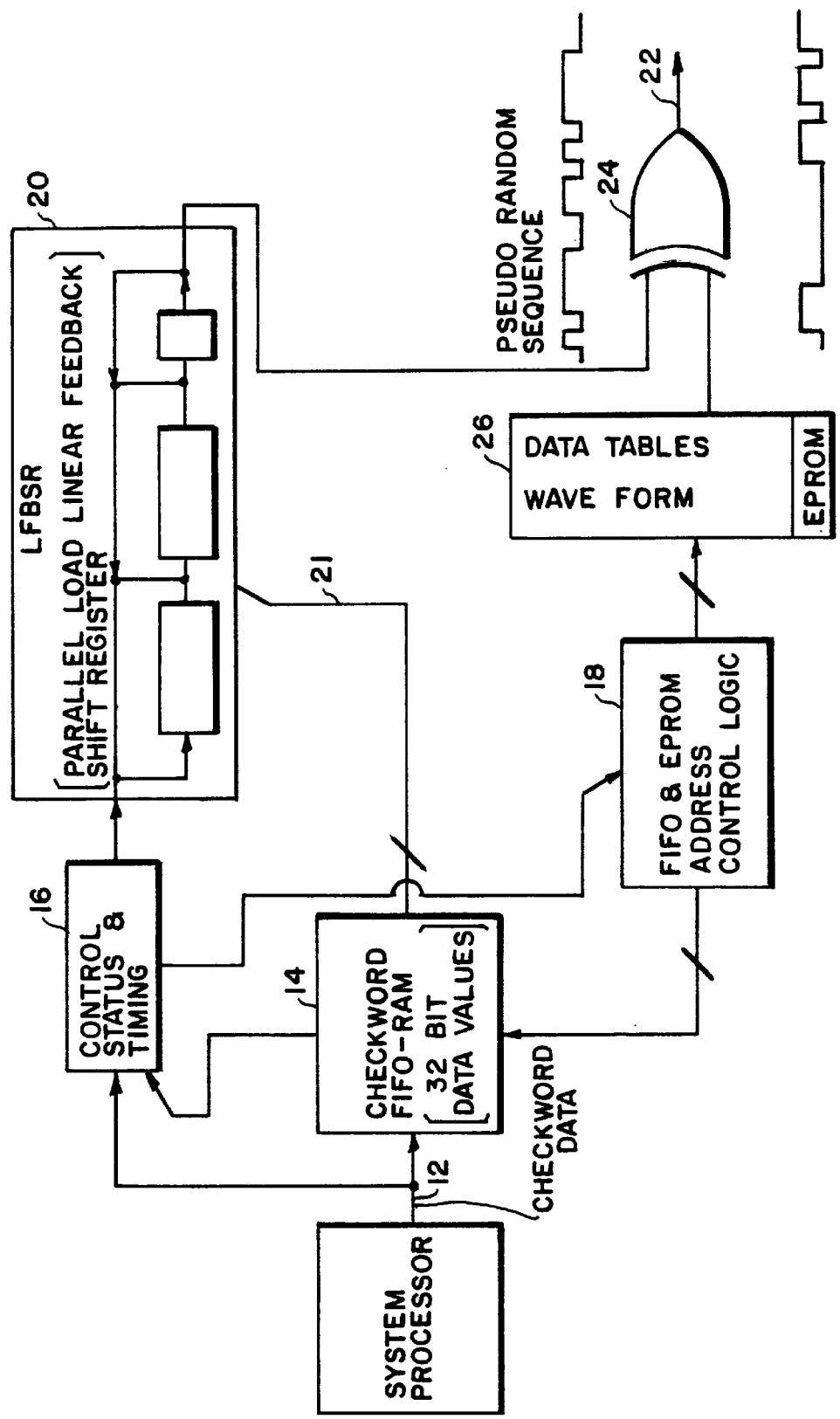
FIG. 1A is a block-schematic diagram of the checkword evaluator/translator portion on the vital relay driver of the present invention.

Before referring specifically to the figures of the drawing, it is considered well to recapitulate the functionality of the NVRD (Numerical Vital Relay Driver) of the present invention. Its general purpose is to accommodate various system cycle timing and data requirements. Also the output stage to be described, which is the vital filter stage, can be adapted to the requirements of a variety of applications.

Referring now to the block diagram of the NVRD of FIG. 1A, it will be seen that the heart of the NVRD is a checkword data translator 10 that converts vital parameters into the required dynamic waveform through the use of a hardware implemented algorithm. This is accomplished through well-known numerical principles based on NISAL, as already explained. It involves typically an "N" bit linear feedback shift register 20 for implementing a primitive polynomial division algorithm.

The basic translator 10, of course, has many possible uses, the main one being to provide a vital watchdog on VPI, or equivalent, system operation. Accordingly, it will be understood that the NVRD of the present invention of FIG. 1A and the vital filter or decoder depicted in FIG. 1B could be substituted for the VRD 4 and detector 5 shown in cited U.S. Pat. No. 4,831,521 for the reasons already explained.

The NVRD accepts check data from a standard bus 12, which is coupled to a system processor. The check data is stored in means 14 which includes a memory designated FIFO RAM. Also included, within means 14, is a checkword FIFO shift register. The incoming check data on input line 12 is also transmitted to means 16 comprising a control status and timing device 16 that coordinates the input of check data with the operation of the FIFO shift register in means 14. The means 16 is further connected to another means 18 having a FIFO shift register and Eprom Address Control Logic shown which functions to control the Waveform Data Table 26 whose data is stored in a fixed memory (EPROM). Means 16 is also connected, at an output, to a programmable logic device or means, which is configured into an "N" bit linear feedback shift register (LFBSR) 20. A connection 21 extends from means 14 to register 20; such connection serves as a means to load and add check data values from means 14.

It will be understood, by reference to VPI U.S. Pat. No. 4,831,521 and based on the desired timing, that the check data is provided to the LFBSR so as to implement the primitive polynomial division algorithm previously referred to. Such algorithm is an essential part of the safety logic principles explained in U.S. Pat. No. 4,831,521, the details of which are incorporated herein by reference. The LFBSR 20 is shifted at a rate corresponding to the resolution required of the waveform at the checkword translators output 22, which exists at the output of an Exclusive Or device 24. The two inputs of device 24 are connected, respectively, to the output of LFBSR 20 and to the output of the variable waveform data tables 26, specifically to the Eprom device contained therein.

The output of the LFBSR 20 is a pseudo-random sequence of binary bits based on the input check data and the polynomial used. Since the LFBSR binary stream of bits, seen applied at the upper input to Exclusive OR device 24, can be predicted using mathematical models, the data for storage in 26 necessary to convert the pseudo-random sequence emanating from the LFBSR 20 into the desired output waveform can be calculated a priori. This binary stream of bits can be seen applied at the lower input to device 24. The LFBSR output is accordingly combined with the stored thus-calculated data from the fixed memory. The result of this combination is the desired periodic waveform, seen at the output 22 of device 24, which is needed to drive the tuned circuit filter or decoder 30 (FIG. 1B).

Figure 1B:
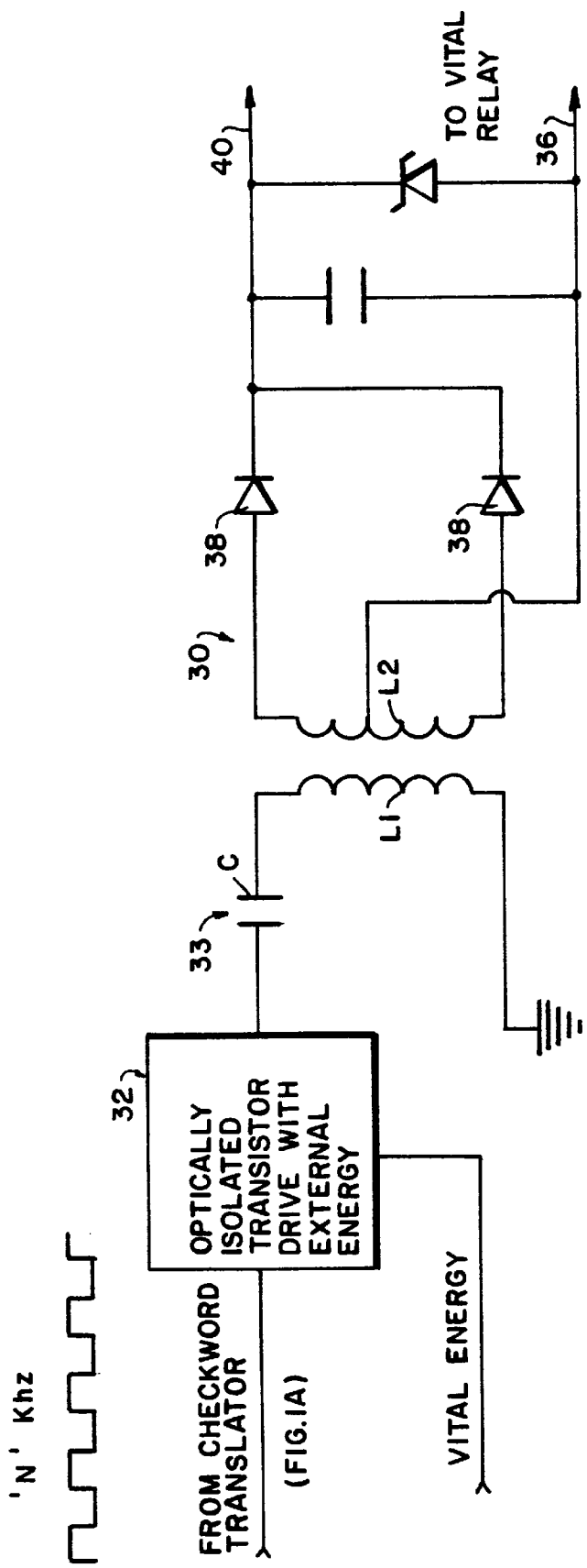
FIG. 1B is a block-schematic diagram of the vital filter/decoder portion of the same vital relay driver.

Referring now to FIG. 1B of the drawing, there will be seen the second part of the vital relay driver of the present invention. This part comprises a vital filter or tuned decoder 30 that receives at its input a periodic signal (nKhz) from the checkword translator 10 (FIG. 1A), which can be suitably isolated by a transistor driver 32. The incoming periodic signal is passed to the vital filter portion 33, including Capacitor C and transformer 34 having appropriate inductances L1 and L2 at the primary and secondary, respectively, for resonance purposes. A mid-tap point at the secondary is connected to one side 36, of the output, and a full wave rectifier 38 is provided to produce DC, the rectifier being connected to the opposite output side 40 for application to a vital relay.

Accordingly, it will be understood that when the appropriate periodic signal is suitably rectified it will cause a vital relay to have its front contacts closed to ensure current flow to appropriate outputs. However, in the event that a completely random signal is generated at the output 22 of the checkword translator 10, then an inappropriate non-periodic signal will be received and the filter will not accept and translate to the appropriate DC signal at its output and thence to the vital relay. Hence, the relay will no longer have its front contacts closed, whereby current will no longer flow to the appropriate outputs.

The robustness of this design in accordance with the present invention is made possible through the use of a software development tool. This tool takes the variables regarding system requirements (that is, desired output waveforms, a number of checkwords provided, and frequency of checkword updates or system check); and converts the input into LFBSR required configurations, sequence timing and waveform conversion data tables for the on-board Eprom.

The advantages to the new design are: the implementation is based as explained on numerical safety techniques; and, therefore, a calculable "Probability of Unsafe Failure" can be found. This differs from the SAL implementation of the former design and avoids the painstaking safety analysis of software and hardware that was required in the former design; secondly, the architecture of the hardware is very flexible. With little or no hardware modifications, the new design, in accordance with the present invention, can be more readily used by other vital systems that require independent vital arbitration of system internal safety checks while using different checkword table values and/or characteristics; thirdly, the desired checkword evaluated output signal can be any waveform desired over a given time interval. This capability allows for the checkword evaluator 10 becoming a stand alone, general purpose vital output structure with many residing in a given system. The unique vital filtering provided by the filter 30 could be installed within a "remotely controlled" sub-system. It will be apparent to those skilled in the art that many other uses could be exploited.

It should be noted that the concept of the present invention can be employed in a creation of a new circuit assembly for a common platform system project. In such employment, the NVRD hardware has been designed to address a VPI like application. In such circuit assembly, an embodiment has been created that includes a dual stage vital filter in place of the single stage vital filter 30 (seen in FIG. 1B), such filter having been arranged to have different frequencies of 125 Khz and 6 Khz. In addition, the translator 10 is designed to feed the dual stage vital filter; accordingly, two LFBSRs 20 are employed, as well as two sets of checkwords being provided for the generation of the two specific frequencies. Two data tables 26 are also established to support both frequencies. The quantity of each checkword set is geared to the desired translator output signal duration, and therefore check period length. Each checkword in set #1 produces five MS of 125 Khz output, whereas set #2 produces two MS. In the current implementation for a fifty MS check period, then ten and twenty-five checkwords from sets #1 and #2, respectively, are delivered to the NVRD to maintain vital output energy.

There are many other uses for the concept of the present invention and the concept can be applied to other types of systems such as Microcabmatic®, Genrakode®, etc., or, in a more fundamental sense, as a vital output circuit. The latter differs from other standard approaches in that the LFBSR output, or taken as a whole, the filter's DC voltage signal, represents a vital output unto itself Up to the present time, numerically based safe outputs involved the non-vital turn on/off with vital verification of the state as feedback into system checks. In the case of the NVRD of the present invention, no feedback checks are necessary.

The invention having been thus described with particular reference to the preferred forms thereof, it will be obvious that various changes and modifications may be made therein without departing from the spirit and scope of the invention as defined in the appended claims.

What is claimed is:

1. A numerical vital relay driver serving as an independent arbiter of vital railway system operation comprising:

a checkword translator for receiving system checkwords from a system processor in the form of "N" bit NISAL parameters, said translator including a linear feedback shift register for implementing a polynomial division algorithm from said checkwords, said shift register having an output;

said translator further including variable waveform data tables having an output, and means, responsive to the respective outputs of the linear feedback shift register and the variable waveform data tables, for combining the signals therefrom, wherein it is insured that only if the checkwords are present and correct within a specific check period and the operation of the algorithm is correct, will the desired periodic signal to be applied be produced.

2. A numerical vital relay driver as defined in claim 1, including a storage means coupled to the input of said checkword translator for storing checkwords; and address control logic device connected to said storage means; and wherein said storage means includes a FIFO shift register.

3. A device as defined in claim 2, further including a control status and timing device coupled (1) to the input of said translator, (2) to an output of said FIFO shift register, and (3) to an input of said address control logic device.

4. A device as defined in claim 3, in which said address control logic device is coupled to another input of said storage means.

5. A device as defined in claim 1, further including an Exclusive Or device having a first input coupled to the data tables and a second input coupled to said linear feedback shift register; wherein the output of the Exclusive Or device provides the desired periodic signal.

6. A numerical vital relay driver including two checkword translators, each as defined in claim 1, the translators having respectively different frequencies of periodic output signals.

7. A device as defined in claim 1, further comprising:

a vital relay;

vital filter means in the form of a tuned decoder coupled to the output of said checkword translator for supplying said periodic signal to the vital relay whose operation permits vital energy to be supplied to system outputs.

8. A numerical vital relay driver as defined in claim 7, including a storage means coupled to the input of said checkword translator for storing checkwords; and address control logic device connected to said storage means; and wherein said storage means includes a FIFO shift register.

9. A device as defined in claim 8, including a control status and timing device coupled to the input of said checkword translator.

10. A device as defined in claim 7, further including an Exclusive Or device having a first input coupled to the checkword data tables and a second input coupled to said linear feedback shift register; wherein the output of the Exclusive Or device provides the desired periodic signal.

* * * * *